US008365761B2

(12) United States Patent
Bleile et al.

(10) Patent No.: US 8,365,761 B2
(45) Date of Patent: Feb. 5, 2013

(54) REGULATOR UNIT AND METHOD FOR REGULATING A FLAP OPENING OF A FLAP SITUATED IN A MASS FLOW LINE

(75) Inventors: Thomas Bleile, Stuttgart (DE); André Wittmer, Holzkirchen (DE)

(73) Assignee: Robert Bosch GmbH, Stuttgart (DE)

( * ) Notice: Subject to any disclaimer, the term of this patent is extended or adjusted under 35 U.S.C. 154(b) by 1057 days.

(21) Appl. No.: 12/315,344

(22) Filed: Dec. 1, 2008

(65) Prior Publication Data

US 2009/0183788 A1 Jul. 23, 2009

(30) Foreign Application Priority Data

Jan. 23, 2008 (DE) ......................... 10 2008 005 648

(51) Int. Cl.
*F16K 31/12* (2006.01)

(52) U.S. Cl. ..................... 137/487; 137/407.5; 137/400; 60/602

(58) Field of Classification Search .................. 137/487, 137/487.5, 488; 60/602
See application file for complete search history.

(56) References Cited

U.S. PATENT DOCUMENTS

| | | | | |
|---|---|---|---|---|
| 4,796,651 | A * | 1/1989 | Ginn et al. | 137/8 |
| 5,146,941 | A * | 9/1992 | Statler | 137/8 |
| 5,190,068 | A * | 3/1993 | Philbin | 137/8 |
| 5,431,182 | A * | 7/1995 | Brown | 137/85 |
| 5,532,922 | A * | 7/1996 | Wacker et al. | 700/32 |
| 5,950,668 | A * | 9/1999 | Baumann | 137/487.5 |
| 6,510,691 | B1 * | 1/2003 | Schmid | 60/602 |
| 6,564,825 | B2 * | 5/2003 | Lowery et al. | 137/487.5 |
| 6,722,347 | B2 * | 4/2004 | Sanchez et al. | 123/520 |
| 6,892,745 | B2 * | 5/2005 | Benson | 137/1 |
| 7,025,088 | B2 * | 4/2006 | Saunders | 137/552 |
| 7,147,430 | B2 * | 12/2006 | Wiggins et al. | 415/19 |
| 7,174,777 | B2 * | 2/2007 | Fischer et al. | 73/114.33 |
| 8,037,866 | B2 * | 10/2011 | Gerum | 123/399 |
| 2002/0117214 | A1 * | 8/2002 | Tucker et al. | 137/487.5 |
| 2004/0128996 | A1 * | 7/2004 | Klingseis | 60/602 |
| 2005/0056316 | A1 * | 3/2005 | McCarty | 137/487.5 |
| 2006/0081799 | A1 | 4/2006 | Wittmer et al. | |
| 2008/0000531 | A1 * | 1/2008 | Robb et al. | 137/488 |

FOREIGN PATENT DOCUMENTS

| | | | |
|---|---|---|---|
| DE | 10 2004 048 860 | | 4/2006 |
| GB | 2123983 | A * | 2/1984 |

* cited by examiner

*Primary Examiner* — John Rivell
*Assistant Examiner* — Minh Le
(74) *Attorney, Agent, or Firm* — Kenyon & Kenyon LLP

(57) ABSTRACT

A regulator unit for regulating a flap opening of a flap arranged in a mass flow line includes: an analyzer unit which is designed for providing an analysis signal on the basis of a predefined desired pressure difference and a difference between pressures upstream and downstream from the flap; a regulator which is designed for determining a trigger signal from the analysis signal according to a regulating characteristic; and a control element-regulating unit which is designed for regulating the flap opening of the flap in the mass flow line in response to the trigger signal.

17 Claims, 4 Drawing Sheets

REGULATOR UNIT AND METHOD FOR REGULATING A FLAP OPENING OF A FLAP SITUATED IN A MASS FLOW LINE

CROSS-REFERENCE TO RELATED APPLICATIONS

The present application claims priority to Application No. 10 2008 005 648.0, filed in the Federal Republic of Germany on Jan. 23, 2008, which is expressly incorporated herein in its entirety by reference thereto.

FIELD OF THE INVENTION

The present invention relates to a regulator unit for regulating a flap opening of a flap situated in a mass flow line and to a method for regulating a flap opening of a flap situated in a mass flow line.

BACKGROUND INFORMATION

Flaps are often provided in the inlet and outlet air lines for the internal combustion engine for controlling an internal combustion engine. These flaps may be opened or closed to permit regulation of a mass flow of a fluid (e.g., air, a fuel-air mixture, exhaust gas or a liquid fuel). The flap (in the form of a throttle member) which is often attached on one side is moved slightly to open a variable line cross section of the line for the flow of the fluid.

If a device which may be used to throttle the mass flow is introduced into a line carrying the fluid, design features may result in the flow having an influence on the regulating behavior of this throttle member. Such a case occurs, for example, when a flap attached on one side is used in a line carrying exhaust gas to regulate the exhaust mass flow through the line and this is operated by an actuator, which in turn exerts a force on the throttle member. Such devices are used, for example, on a wastegate of a turbocharger or an exhaust gas regulating flap for two-step charging using a pneumatic actuator.

A model with the help of which the torques acting on the flap may be calculated and thus the triggering may be corrected is described in DE 10 2004 048 860.

In most cases, however, due to interference variables in the real surroundings, an additional regulator is needed to compensate for deviations that occur. The optimal regulator gain is a function of the system gain around the operating point of the machine to be regulated. This may in turn be influenced to a great extent by the forces acting on the throttle member.

SUMMARY

Example embodiments of the present invention provide for a possibility for improving the regulating properties, which also rapidly and reliably takes into account interference variables in the real surroundings in such a scenario.

Example embodiments of the present invention provide a regulator unit for regulating a flap opening of a flap in a mass flow line, where the regulator unit has the following features: an analyzer unit designed to provide an analysis signal on the basis of a difference between a predefined desired pressure difference and pressures upstream and downstream from the flap; a regulator designed to determine a trigger signal from the analysis signal according to a regulating characteristic; and a control element-regulating unit designed to regulate the flap opening of the flap in the mass flow line in response to the trigger signal.

An analysis signal may be supplied by using an observed, i.e., modeled or measured, pressure difference in relation to a predefined desired pressure difference. This analysis signal is used as the input signal for the regulator having the regulating characteristic, so that the parameters in the actual operating surroundings are already contained in the input signal for the regulator. It is possible in this manner to advantageously avoid having to take into account parameters that depend on the operating point and/or mode of operation in the regulating characteristic. These parameters have already been used to provide the analysis signal, so that regulation may be implemented much more easily and thus more efficiently in the regulator.

It is also favorable if the analyzer unit is designed to provide the analysis signal as a function of the difference between the predefined desired pressure difference and pressures upstream and downstream from the flap and also as a function of a relationship between a predefined desired flap opening and an observed flap opening of the flap. This offers the advantage that not only is a parameter of the actual operating surroundings used during operation of the regulator unit but also several ambient parameters occurring in real operation are taken into account, so that a faster transient response and more precise regulation of the mass flow through the flap opening may be implemented.

The regulator unit may also include a precontrol unit designed to ascertain a precontrol signal from the predefined desired flap opening and the predefined desired difference between pressures upstream and downstream from the flap and the control element-regulating unit being designed to regulate the flap opening as a function of the trigger signal and of the precontrol signal. This offers the advantage that the analysis signal may be set without taking into account steady-state conditions, so that in ascertaining the analysis signal, only a small number of parameters need be taken into account. In addition, this results in a simpler structure of the analyzer unit, which allows a less expensive implementation thereof on the one hand while on the other hand increasing the robustness of the regulating response.

The analyzer unit may also be designed to provide a differential pressure signal based on the difference between a desired pressure difference and differences upstream and downstream from the flap, to ascertain a differential pressure force signal on the basis of the differential pressure signal using a regulating pressure characteristic curve and to provide the analysis signal on the basis of the differential pressure force signal. This offers the advantage that analysis of the pressure differences in the analyzer unit may be performed very rapidly and easily numerically (e.g., by lookup in a lookup table), which also has advantageous effects on the regulating speed and thus a rapid transient response.

Additionally or alternatively, the analyzer unit may also be designed to form a flap difference signal from the relationship between the desired flap opening and an observed flap opening to determine from the flap difference signal a differential area force signal using a predetermined regulating area characteristic curve and to provide the analysis signal on the basis of the differential area force signal. This offers the advantage that analysis of the flap opening in the analyzer unit may be performed very rapidly and easily numerically (e.g., by lookup in a lookup table), which in turn has an advantageous effect on the regulating speed and thus a rapid transient response.

It is also favorable if the precontrol unit is designed to ascertain the precontrol signal from the predefined desired difference between the pressures upstream and downstream from the flap on the basis of a predefined precontrol pressure characteristic curve. In this case specifically the analyzer unit may be designed to perform the analysis signal using a regulating pressure characteristic curve based on the precontrol pressure characteristic curve. This offers the advantage that only a corresponding precontrol pressure characteristic curve may be input in the regulator unit, this precontrol pressure characteristic curve being usable for the precontrol unit on the one hand and also for the analyzer unit on the other hand. This results in a simple method of providing this characteristic curve before storing the characteristic curve in the regulator unit on the one hand and also results in a stable regulating performance on the other hand because regulation is performed on the basis of the connected regulation characteristic curves.

The regulating pressure characteristic curve may also be representable as a derivative of the precontrol pressure characteristic curve. This is a simple implementation of the regulating pressure characteristic curve, which is derivable numerically from the precontrol pressure characteristic curve in an uncomplicated manner. In particular, proven and easy to implement methods are available for efficiently forming a derivative, so that only the precontrol pressure characteristic curve for the precontrol unit need be saved.

Accordingly the precontrol unit may also be designed similarly to ascertain the precontrol signal of the predefined desired flap opening on the basis of a predefined precontrol area characteristic curve such that the analyzer unit may then be designed to perform the analysis signal using a regulation area characteristic curve based on the precontrol area characteristic curve. In this regard, it may also be pointed out that only the precontrol area characteristic curve need be stored in the precontrol unit from which the regulation area characteristic curve may then be determined in a numerically efficient manner.

Similarly, the regulation area characteristic curve may also be represented as a derivative of the precontrol area characteristic curve. This is a numerically simple implementation of the method of providing the regulation area characteristic curve, so that only the precontrol area characteristic curve need be stored in the precontrol unit.

Furthermore, example embodiments of the present invention provide a method for regulating a flap opening of a flap situated in a mass flow line, the method including: providing an analysis signal on the basis of the difference between a predefined desired pressure difference and pressures upstream and downstream from the flap; determining a trigger signal from the analysis signal according to a regulating characteristic; and regulating the flap opening of the flap in the mass flow line in response to the trigger signal.

Example embodiments of the present invention provide a computer program for performing the present method when the computer program is run on a computer. This ensures efficient implementation also on a computer-supported platform, so that example embodiments of the present invention may also be implemented in the on-board computers that are already commonly used in vehicles.

Example embodiments of the present invention are described in greater detail below with reference to the appended Figures.

DETAILED DESCRIPTION

Figure 1:
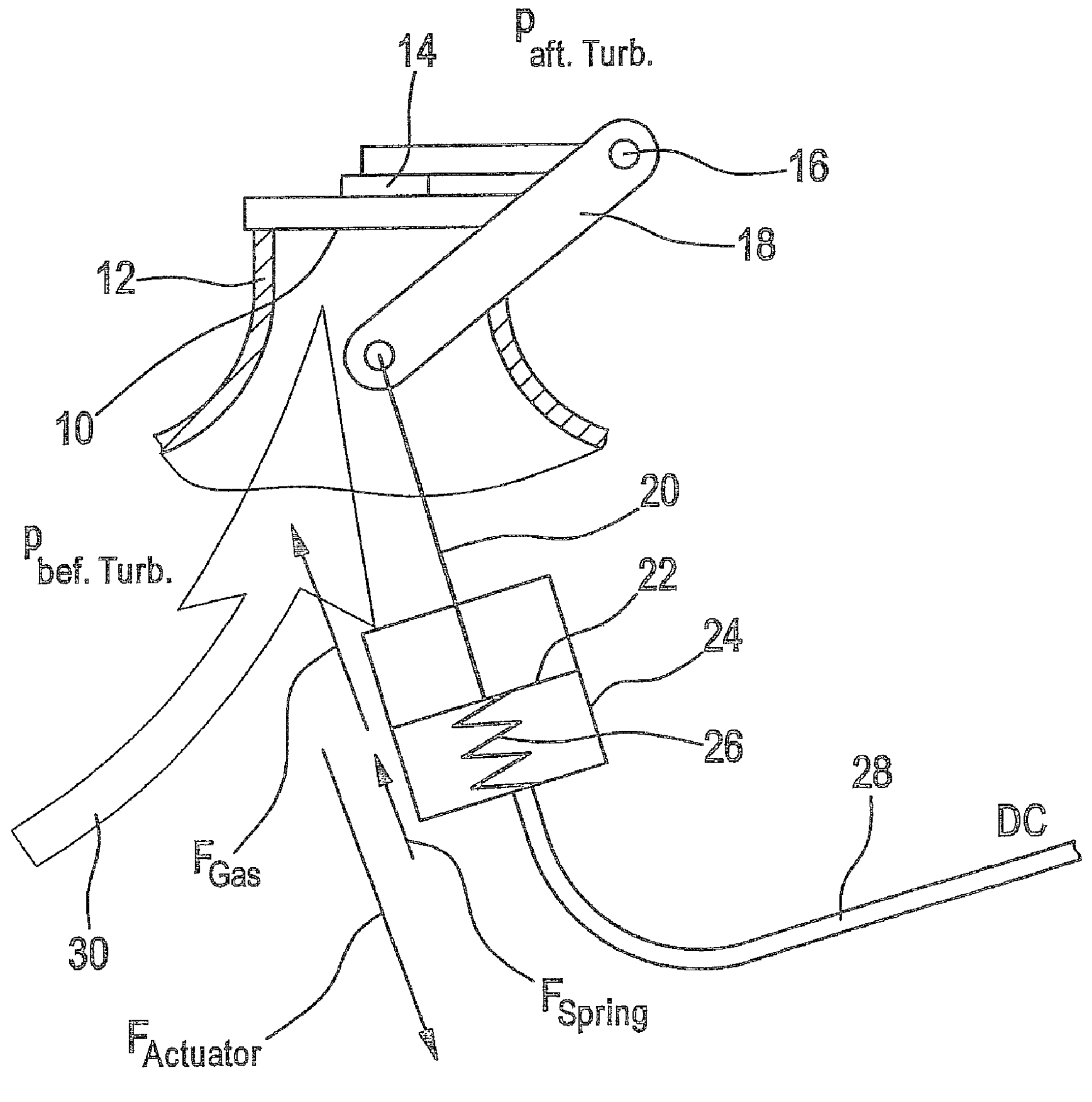
FIG. 1 shows a diagram of a final controlling element for controlling a flap opening in a fluid line.

In the following Figures, the same or similar components may be provided with the same or similar reference numerals. In addition, any dimensions and measurements that are given are only examples, so the present invention is not limited to these dimensions and measurements. Furthermore, the figures and the drawings, their description and the claims include numerous features in combination. It is clear to those skilled in the art that these features may also be considered individually or may be combined into other combinations not explicitly described here.

The environment where example embodiments of the present invention is used is explained first in greater detail below on the basis of FIGS. 1 and 2. Example embodiments of the present invention may be provided to close an opening 10 in a fluid line 12 using a flap 14, as illustrated in FIG. 1. Fluid line 12 may be an intake connection for a turbocharger or a line connected in parallel with a turbocharger. Fluid line 12, however, may also be provided for another medium, e.g., air, a fuel-air mixture, exhaust gas or a liquid fuel. Flap 14 is attached to suspension 16 on one side and may be operated by lever 18 and control pull 20. Control pull 20 is attached to a diaphragm 22, which is in a vacuum container 24. On the side of diaphragm 22 opposite control pull 20, a spring 26 exerts a spring force upward on diaphragm 22. In addition, vacuum container 24 is connected to a vacuum hose 28, through which a vacuum in the lower part of vacuum container 24 (i.e., in the area where spring 26 is situated) may be adjusted. The (control) vacuum supplied via vacuum hose 28 is DC-modeled (DC=duty cycle), so that information is transmitted. This means that the information to be transmitted is modulated between 0% and 100% via a duty cycle. This DC-modulated vacuum signal may be supplied through a vacuum pump, for example, in combination with an electropneumatic converter.

If the vacuum in the lower part of vacuum container 24 is increased via vacuum hose 28, then an actuator force $F_{Actuator}$ directed downward is exerted on diaphragm 22, as illustrated in FIG. 1. This is counteracted by a spring force $F_{Spring}$ directed upward. In addition, a pressure before a flap opening (e.g., of a turbine) $P_{bef.Turb}$ may also be obtained from mass flow 30 of the fluid which is higher than a pressure after the flap opening (of the turbine) $P_{aft.Turb}$, so that flap 14 (upward=opened) is depressed and an upwardly directed fluid force $F_{Gas}$ on diaphragm 22 results via suspension 16, lever 18 and control pull 20. If downward acting actuator force $F_{Actuator}$ is greater than the sum of spring force $F_{Spring}$ and fluid force $F_{Gas}$, then flap 14 is pulled down and reduces flap opening 10. This reduction takes place due to the fact that an effective line cross section of flap opening 10 is decreased, resulting in a reduction in mass flow 30. The control pressure acting on the diaphragm may also be excess pressure which acts against the spring force (spring force acts in the closing direction, control force acts in the opening direction, which is typical with gasoline engines having turbocharging).

Figure 2:
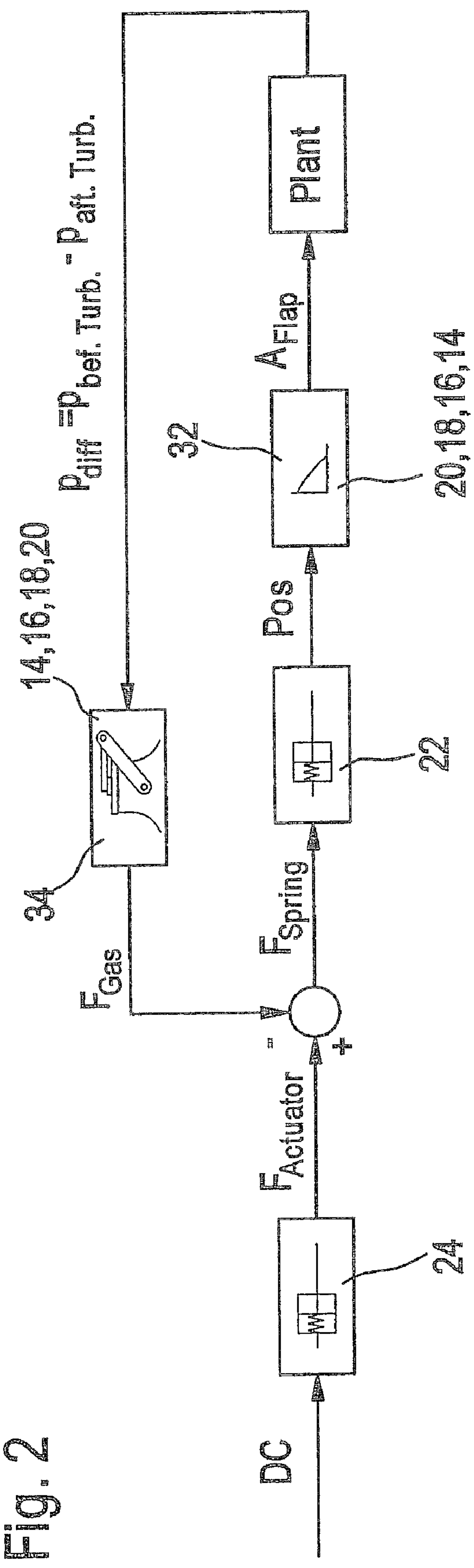
FIG. 2 shows a block diagram of a system for triggering the final controlling element according to FIG. 1.

FIG. 2 shows a block diagram illustrating schematically a regulating circuit of the closure element from FIG. 1. The DC-modulated control pressure is first converted via the diaphragm mechanism of actuator 24 into an actuator force $F_{Actuator}$. Fluid force $F_{Gas}$ caused by mass flow 30 is subtracted from this actuator force $F_{Actuator}$ resulting in spring force $F_{Spring}$ of spring 26 according to the force breakdown in FIG. 1. A position Pos of diaphragm 22 of actuator 24 results via diaphragm 22 of actuator 24, such that a position of this flap 14 effectively opening a line cross section $A_{Flap}$ results via the functional relationship of element 32 with control pull 20, lever 18, suspension 16 and flap 14. The pressure ratios of mass flow 30 before and after flap opening 10 change as a result of the system, labeled as Plant in FIG. 2 (and has the turbine and/or an engine), resulting in a differential pressure $p_{diff}$. This differential pressure $p_{diff}$ is converted into fluid force $F_{Gas}$ via the functional relationship of element 34 with flap 14, suspension 16, lever 18 and final control element 20. This fluid force is then subtracted from actuator force $F_{Actuator}$, thereby closing the regulating circuit in FIG. 2. A desired mode of operation of the system may be adjusted through the DC-modulated control pressure, the precision adjustment of which is accomplished through the pressure difference before and after the flap opening and the spring force on the diaphragm. It should be pointed out that the unit depicted in FIG. 1 and in FIG. 2 may also be operated with an excess pressure and/or without a spring (which corresponds to a spring constant of 0).

Figure 3:
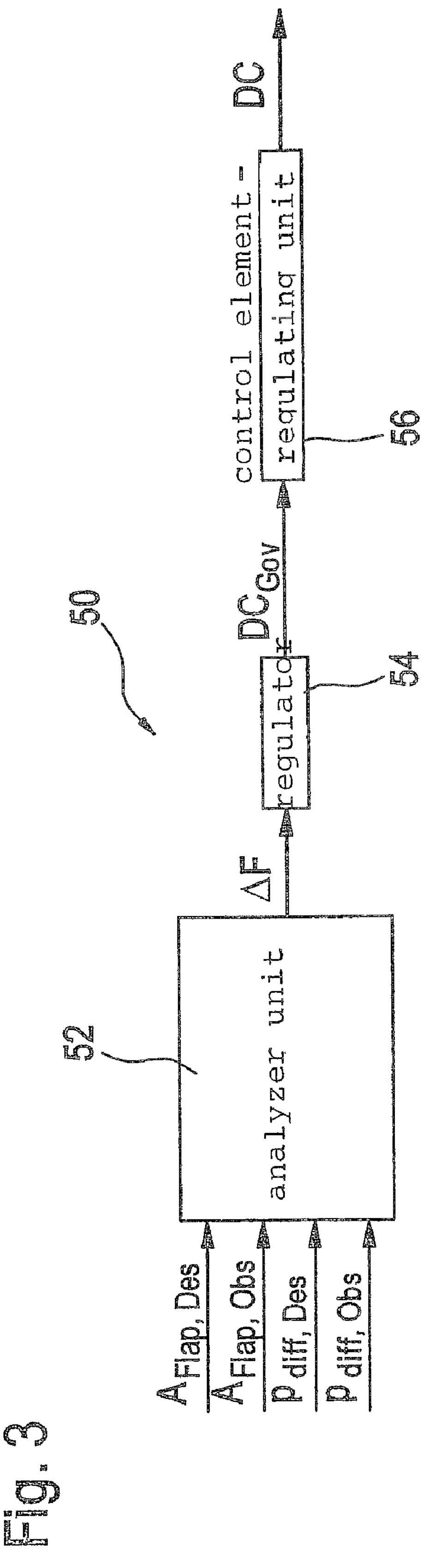
FIG. 3 shows a block diagram of an example embodiment of the present invention.

FIG. 3 shows a block diagram of an exemplary embodiment of the present invention in the form of a regulator unit 50. Regulator unit 50 includes one analyzer unit 52, a regulator 54 and a final controlling element-regulating unit 56. Analyzer unit 52 is designed to provide an analysis signal from an observed pressure difference before and after the flap opening and a desired pressure difference and/or from an observed effective line cross section and a desired effective line cross section. The effective line cross section at the flap opening may be produced by an adjustment of flap 14 shown in FIG. 1, so that there may be a greater or lesser flow of the fluid through the flap opening. The effective line cross section thus constitutes a measure of the degree of opening of flap 14. From the analyzer signal, regulator 54 may then generate a trigger signal according to a regulator characteristic, e.g., a PID, a PT regulating characteristic or the like according to which control element-regulating unit 56 may regulate the opening of flap 14 from FIG. 1.

In contrast with conventional arrangements in which parameters depending on the particular operating point and/or the corresponding mode of operation are to be taken into account in the regulator to be used, this is no longer necessary according to example embodiments of the present invention. The parameters to be taken into account for the corresponding operating point and/or the corresponding operating mode are already included when providing the analysis signal. This makes it possible for regulator 54 to be provided with a very simple regulating characteristic without having to adapt this regulating characteristic in advance to the corresponding operating surroundings of the regulator. This also allows the use of simple linear regulating algorithms that are easy to implement and at the same time have a high regulating stability. Furthermore, such a regulating characteristic requires only a small memory, additionally resulting in a reduced demand for resources for implementation of regulating unit 50.

Figure 4:
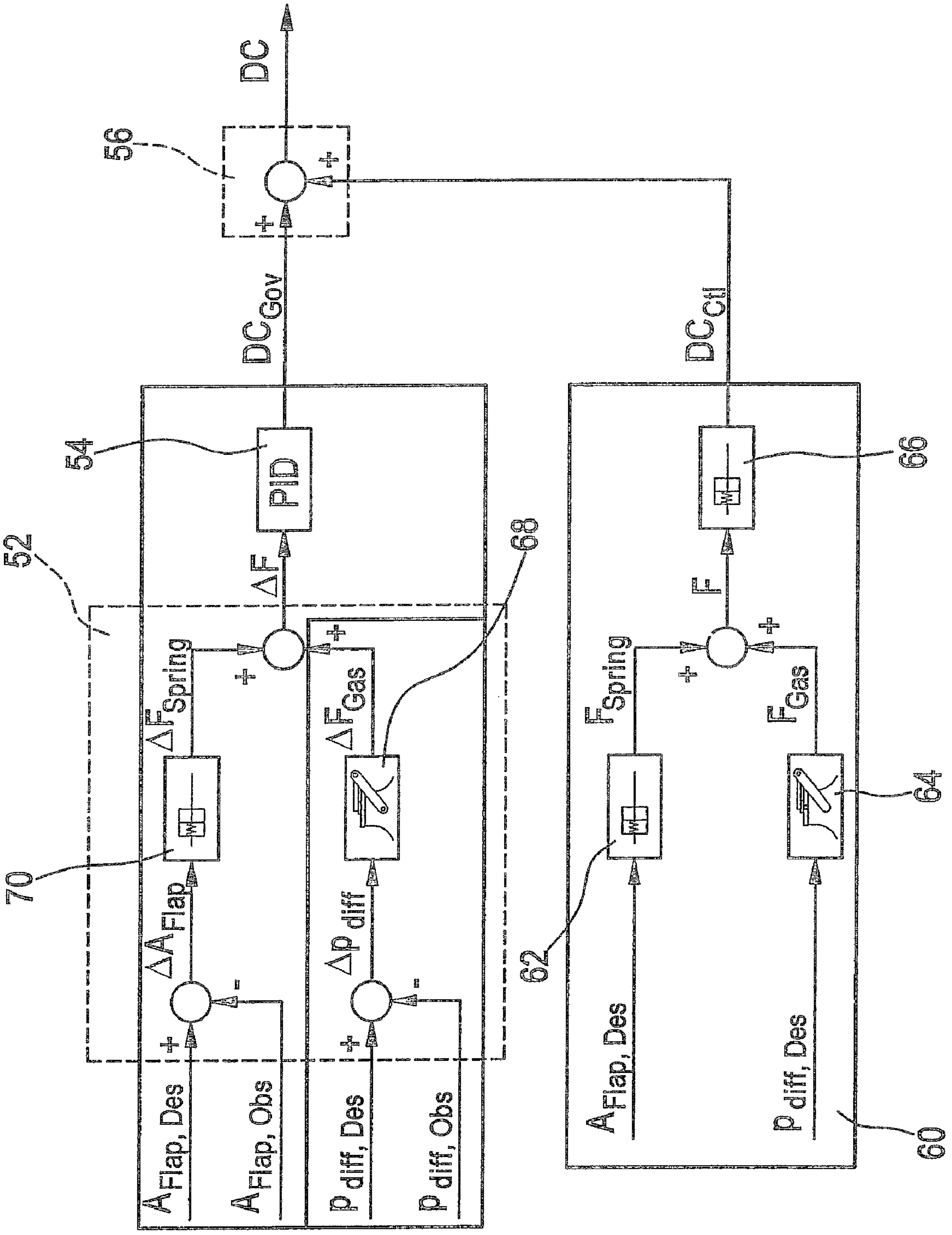
FIG. 4 shows a block diagram of a detail of a regulating circuit of an example embodiment of the present invention.

FIG. 4 shows a block diagram of an exemplary embodiment of the regulator unit. An additional precontrol 60 is used here, via which static variables that are independent of the current operating point of the operating machine (e.g., the internal combustion engine) regulated by the flap opening may be impressed upon the regulating system. In this precontrol, based on the regulating circuit shown in FIG. 2, a desired effective line cross section $A_{Flap,Des}$ is converted by a first converting element 62 into a signal $F_{spring}$ corresponding to the spring force. This first converting element 62 may be implemented in the form of a stored characteristic curve. The spring force corresponding to the desired effective line cross section $A_{Flap,Des}$ may then be ascertained or read from this characteristic curve. Similarly, a fluid force or gas force $F_{Gas}$ and/or a corresponding signal may be ascertained from the desired pressure difference via a second converting element 64, which may likewise be a stored characteristic curve. Spring force $F_{Spring}$ and fluid force $F_{Gas}$ (and/or the corresponding signals) are then added and supplied accordingly to a third converting element 66 in a precontrol signal $DC_{Ctl}$ and this precontrol signal is output to control element-regulating unit 56. In addition, FIG. 4 shows that first converting element 62 has an inverse functionality to that of elements 22 and 32 shown in FIG. 2. Again, second converting element 64 has an inverse functionality to that of element 34 shown in FIG. 2, third converting element 66 having an inverse functionality to that of element 24 from FIG. 2. Using such a precontrol, operation of the operating machine is relatively accurately adjustable by regulation of the flap opening. The prerequisite for an accurate setting, however, is that the functional relationship of the operating parameters (e.g., pressure before and after the flap opening, effective line cross section of the flap opening) of the operating machine is known precisely, although this is not always the case in actual operating surroundings.

The approach described herein is used at this point. An equalizing unit (also referred to as a governor) is provided, including analyzer unit 52 and regulator 54. In a first path, a difference $\Delta p_{diff}$ between these two pressure differences may be ascertained in analyzer unit 52 from an observed pressure difference $p_{diff,Obs}$ and a desired pressure difference $p_{diff,Des}$ and according to the flap opening, and this difference may be converted into a differential pressure force signal $\Delta F_{Gas}$ by a fourth converting element 68. This fourth converting element 68 may also be implemented in the form of a simple characteristic curve that is electronically processable. Second converting element 64 is already designed for implementing a similar functional relationship of a pressure into a force. Since fourth converting element 68 is to convert a difference of a pressure difference into a differential force, the derivative (at the particular operating point of the operating machine) of a characteristic curve implemented for second converting element 64 may easily be used for the fourth converting element. This allows a very simple determination of this differential pressure force $\Delta F_{Gas}$ or the corresponding signal. Similarly, in the second path of analyzer unit 52, a difference between desired effective line cross section $A_{Flap,Des}$ and observed effective line cross section $A_{Flap,Obs}$ may also be determined. This difference may result, for example, from vibration effects on the machine or component tolerances in mass production, so that flap 14 is not always regulated exactly as desired. This difference is usually determined from a measured value of the system (e.g., charging pressure). A differential area force signal $F_{Spring}$ which is combined with and/or added to differential pressure force signal $\Delta F_{Gas}$ to form analysis signal $\Delta F$ is determined from this difference between the desired and the observed effective line cross section using a fifth converting element 70. Fifth converting element 70 may be designed similarly to first converting element 62 (according to the above discussion with respect to fourth converting element 68). In particular, the formation of a derivative of a characteristic curve implemented for first converting element 62 (at the corresponding operating point of the operating machine) may be used for very simple implementation of fifth converting element 70. Analysis signal $\Delta F$ of analyzer unit 52 need not be implemented on the basis of a difference $\Delta p_{diff}$ between the pressure differences and at the same time a difference $\Delta A_{Flap}$ of the desired and observed effective line cross sections; instead, the correction with respect to one of the aforementioned parameters is sufficient to achieve an improvement in the regulating behavior of regulator unit 50. The analysis signal is then sent to regulator 54, which performs the regulation on the basis of a very simple regulating characteristic (like a PID regulating characteristic, a PT regulating characteristic or the like) and outputs a corresponding trigger signal $DC_{Gov}$ to control element-regulating unit 56. Control element-regulating unit 56 may then regulate the opening of the flap (e.g., by DC modulation of the vacuum) on the basis of analysis signal $DC_{Gov}$ alone (which is not shown in FIG. 4) or in combination with precontrol signal $DC_{Ctl}$ (e.g., by DC modulation of the vacuum). Conventional control mechanisms as alternatives to vacuum control may also be used for such regulation. With the design illustrated in FIG. 4, a stable, simple, and thus inexpensively implementable regulation may be constructed via the repeated use of a small number of regulating unit elements, so that the ambient conditions are taken into account better than in the related art at the same time.

Figure 5:
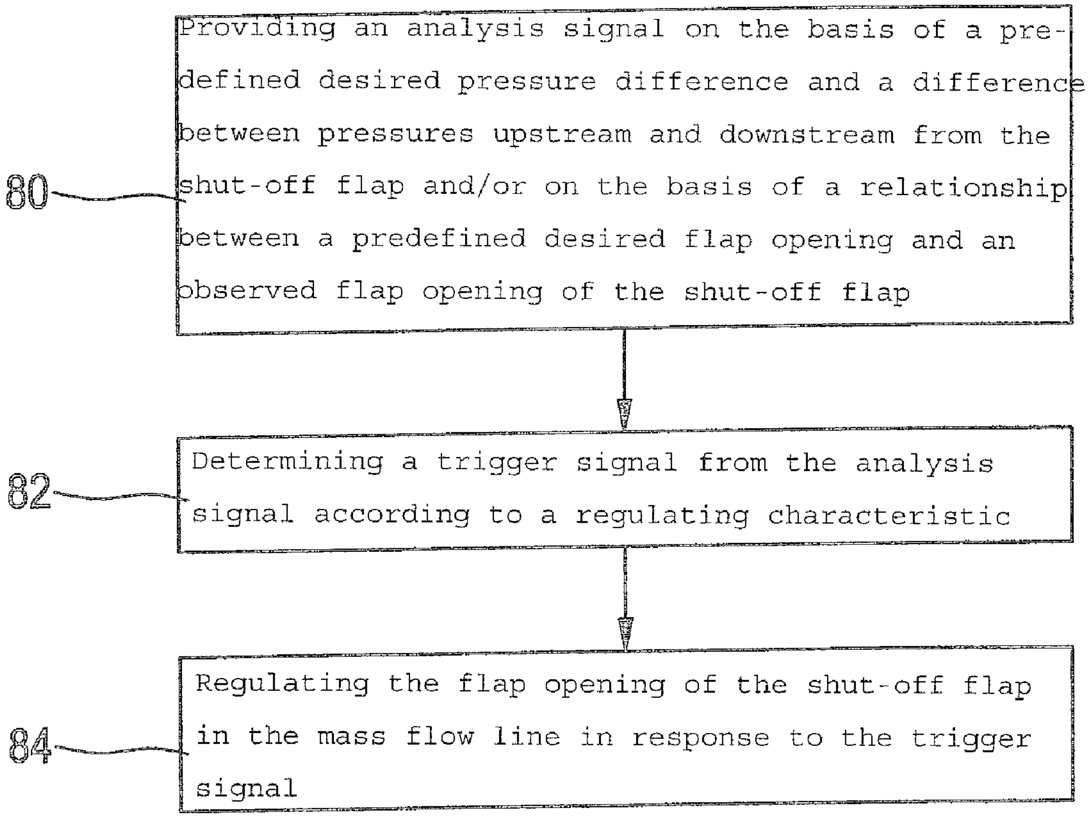
FIG. 5 shows a flow chart of an exemplary embodiment of the present invention.

FIG. 5 shows an exemplary embodiment of the present invention in the form of a method. In a first step, an analysis signal is provided 80 on the basis of the difference between pressures upstream and downstream from the flap and a predefined desired pressure difference and/or on the basis of a relationship between a predefined desired flap opening and an observed flap opening of the flap. In a second step, a trigger signal is determined 82 from the analysis signal according to a regulating characteristic, whereupon in a third step the flap opening of the flap in the mass flow line is regulated 84 in response to the trigger signal.

In summary, example embodiments of the present invention provide dynamic regulation of force-influenced actuators, for example. The effect of the various forces on the resulting torque about the shaft of the flap is shown as an example of a flap in the exhaust system on the basis of a system diagram and a block diagram in FIGS. 1 and 2. A pneumatic actuator acted upon by a vacuum is assumed; its position may be adjusted by a spring. It does not matter for the basic function whether the spring in the actuator opens or closes the flap or whether the spring is even installed at all (spring constant=0). In addition, this approach may also be used for an actuator acted upon by pressure (gasoline engine, utility vehicles). The variable which changes as a result of the triggering of the actuator is the force acting on the diaphragm and on the rod of the actuator due to the change in the vacuum. The sensitivity of the system, which is decisive for dynamic regulation as a function of the instantaneous operating point is thus $$\frac{\partial F}{\partial DC}.$$

The regulator structure illustrated in FIG. 4 calculates the force acting at the moment in the precontrol path and calculates the system deviation as the resulting force based on the deviation from the planned operating point. This is sent to a PID regulator from which an adapted gain for the triggering then follows. The additional information required for parameterization of the novel part may then be ascertained from the slope of the correction characteristic curve from the precontrol path. An advantage is that no operating point-dependent or operating mode-dependent parameters need be applied for the linear PID regulator and stored in the control unit. This results in a reduced demand on resources and simplified calibration.

What is claimed is:

1. A regulator unit for regulating a flap opening of a flap arranged in a mass flow line, comprising:

an analyzer unit adapted to provide an analysis signal in accordance with a predefined desired pressure difference and a difference between pressures upstream and downstream from the flap;

a regulator adapted to determine a trigger signal from the analysis signal according to a regulating characteristic; and a control element-regulating unit adapted to regulate the flap opening of the flap in the mass flow line in response to the trigger signal;

wherein the regulator unit includes a precontrol unit adapted to ascertain a precontrol signal from the predefined desired flap opening and the predefined desired difference between pressures upstream and downstream from the flap, the control element-regulating unit adapted to regulate the flap opening as a function of the trigger signal and the precontrol signal.

2. The regulator unit according to claim 1, wherein the analyzer unit is adapted to provide the analysis signal as a function of the predefined desired pressure differences between pressures upstream and downstream from the flap and as a function of a relationship between a predefined desired flap opening and an observed flap opening of the flap.

3. The regulator unit according to claim 1, wherein the analyzer unit is adapted to provide a differential pressure signal from the difference between pressures upstream and downstream from the flap and a desired pressure difference, to ascertain a differential pressure force signal in accordance with the differential pressure signal using a predetermined regulating pressure characteristic curve and to provide the analysis signal in accordance with the differential pressure force signal.

4. The regulator unit according to claim 1, wherein the analyzer unit is adapted to form a flap difference signal from a relationship between the desired flap opening and an observed flap opening of the flap, to determine a differential area force signal from the flap difference signal using a predetermined regulation area characteristic curve and to provide the analysis signal in accordance with the differential area force signal.

5. The regulator unit according to claim 1, wherein the precontrol unit is adapted to ascertain the precontrol signal from the predefined desired difference between the pressures upstream and downstream from the flap in accordance with a predefined precontrol pressure characteristic curve, the analysis unit adapted to perform the analysis signal using a regulating pressure characteristic curve based on the predefined precontrol pressure characteristic curve.

6. The regulator unit according to claim 5, wherein the regulating pressure characteristic curve is representable as a derivative of the predefined precontrol pressure characteristic curve.

7. The regulator unit according to claim 1, wherein the precontrol unit is adapted to ascertain the precontrol signal of the predefined flap opening in accordance with a predefined precontrol area characteristic curve, the analyzer unit adapted to perform the analysis signal using a regulating area characteristic curve based on the predefined precontrol area characteristic curve.

8. The regulator unit according to claim 7, wherein the regulation area characteristic curve is representable as a derivative of the predefined precontrol area characteristic curve.

9. A method for regulating a flap opening of a flap arranged in a mass flow line, comprising:

providing an analysis signal in accordance with a predefined desired pressure difference and a difference between pressures upstream and downstream from the flap;

determining a trigger signal from the analysis signal according to a regulating characteristic; and regulating the flap opening of the flap in the mass flow line in response to the trigger signal;

wherein the regulator unit includes a precontrol unit adapted to ascertain a precontrol signal from the predefined desired flap opening and the predefined desired difference between pressures upstream and downstream from the flap, the control element-regulating unit adapted to regulate the flap opening as a function of the trigger signal and the precontrol signal.

10. The method according to claim 9, wherein the analysis signal is provided as a function of the predefined desired pressure differences between pressures upstream and downstream from the flap and as a function of a relationship between a predefined desired flap opening and an observed flap opening of the flap.

11. The method according to claim 9, wherein a differential pressure signal is provided from the difference between pressures upstream and downstream from the flap and a desired pressure difference, to ascertain a differential pressure force signal in accordance with the differential pressure signal using a predetermined regulating pressure characteristic curve and to provide the analysis signal in accordance with the differential pressure force signal.

12. The method according to claim 9, wherein the analyzer unit is adapted to form a flap difference signal from a relationship between the desired flap opening and an observed flap opening of the flap (14), to determine a differential area force signal from the flap difference signal using a predetermined regulation area characteristic curve and to provide the analysis signal in accordance with the differential area force signal.

13. A method for regulating a flap opening of a flap arranged in a mass flow line, comprising:

providing an analysis signal in accordance with a predefined desired pressure difference and a difference between pressures upstream and downstream from the flap;

determining a trigger signal from the analysis signal according to a regulating characteristic; and regulating the flap opening of the flap in the mass flow line in response to the trigger signal;

wherein a precontrol signal is ascertained from the predefined desired flap opening and the predefined desired difference between pressures upstream and downstream from the flap, and wherein the flap opening is regulated as a function of the trigger signal and the precontrol signal.

14. The method according to claim 13, wherein the precontrol signal is ascertained from the predefined desired difference between the pressures upstream and downstream from the flap in accordance with a predefined precontrol pressure characteristic curve, and wherein the analysis signal using a regulating pressure characteristic curve is based on the predefined precontrol pressure characteristic curve.

15. The method according to claim 14, wherein the regulating pressure characteristic curve is representable as a derivative of the predefined precontrol pressure characteristic curve.

16. The method according to claim 13, wherein the precontrol signal of the predefined flap opening is ascertained in accordance with a predefined precontrol area characteristic curve, and wherein the analysis signal is obtained using a regulating area characteristic curve based on the predefined precontrol area characteristic curve.

17. The method according to claim 16, wherein the regulation area characteristic curve is representable as a derivative of the predefined precontrol area characteristic curve.

* * * * *